3,216,898
METHOD OF PRODUCING TRYPTAMINE ANTAGONISM WITH 5-SUBSTITUTED-3-(2'-AMINOPROPYL)INDOLES
Edwin J. Fellows, Glenside, Pa., assignor to Smith Kline & French Laboratories, Philadelphia, Pa., a corporation of Pennsylvania
No Drawing. Continuation of application Ser. No. 786,673, Jan. 14, 1959. This application Apr. 20, 1962, Ser. No. 188,962
5 Claims. (Cl. 167—65)

This application is a continuation of Serial No. 786,673, filed January 14, 1959, now abandoned.

This invention relates to novel compositions having tryptamine antagonist activity and containing new 5-substituted-3-(2'-aminopropyl)indoles and to a method of producing tryptamine antagonism by administering said indoles.

The novel compositions of this invention are advantageous in that the active ingredients, i.e. the 5-substituted-3-(2'-aminopropyl)indoles, unexpectedly have tryptamine antagonist activity not demonstrated by related prior art compounds at equal or greater doses. Tryptamine antagonist activity is a characteristic action of tranquilizers. Where any of three structural characteristics of the compounds of this invention, i.e. the 3-(2'-aminopropyl) substituent, the 5-substituents and the absence of a methyl substituent in the 2-position of the indole nucleus, are changed to give prior art compounds, i.e. the 5-methoxy- or 5-chloro-2-(2'-aminoethyl)indole, the 5-unsubstituted-3-(2'-aminopropyl)indole or the 2-methyl-5-methoxy-3-(2'-aminopropyl)indole, the tryptamine antagonist activity is lost at equal or greater doses. The 5-substituted-3-(2'-aminopropyl)indoles have central nervous system and cardiovascular activity. In addition to their activity as tranquilizers and conditioned response blockers, they have anorectic, hypotensive and pressor activity.

More specifically, the compounds according to this invention comprise a pharmaceutical carrier and, as the active ingredient, a novel 5-substituted-3-(2'-aminopropyl)indole having the following formula:

Formula I

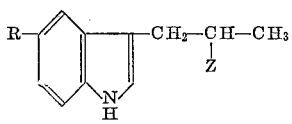

when:

R is methoxy, chloro or trifluoromethyl, and
Z is amino, monomethylamino or dimethylamino.

Advantageous compositions of this invention contain as an active ingredient a compound of Formula I in which R is chloro or methoxy. Particularly preferred are compositions containing those compounds of Formula I in which R is chloro or methoxy and Z is amino.

The 5-substituted-3-(2'-aminopropyl)indole may be advantageously used in the compositions of this invention in the form of their pharmaceutically acceptable salts formed with nontoxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl or chloroform, with the desired salt separating directly. Exemplary of such organic salts are those with maleic, fumaric, benzoic, ascorbic, pamoic, succinic, bismethylenesalicyclic, methanesulfonic, ethanedisulfonic, acetic, propionic, tartaric, salicyclic, citric, gluconic, lactic, malic, mandelic, cinnamic, citraconic, aspartic, stearic, palmitic, itaconic, glycolic, p-aminobenzoic, glutamic, benzenesulfonic and theophyllineacetic acids as well as with the 8-halotheophyllines, for example, 8-chlorotheophylline and 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well-known to the art.

The new 5-substituted-3-(2'-aminopropyl)indoles of Formula I are prepared according to the following synthetic procedure:

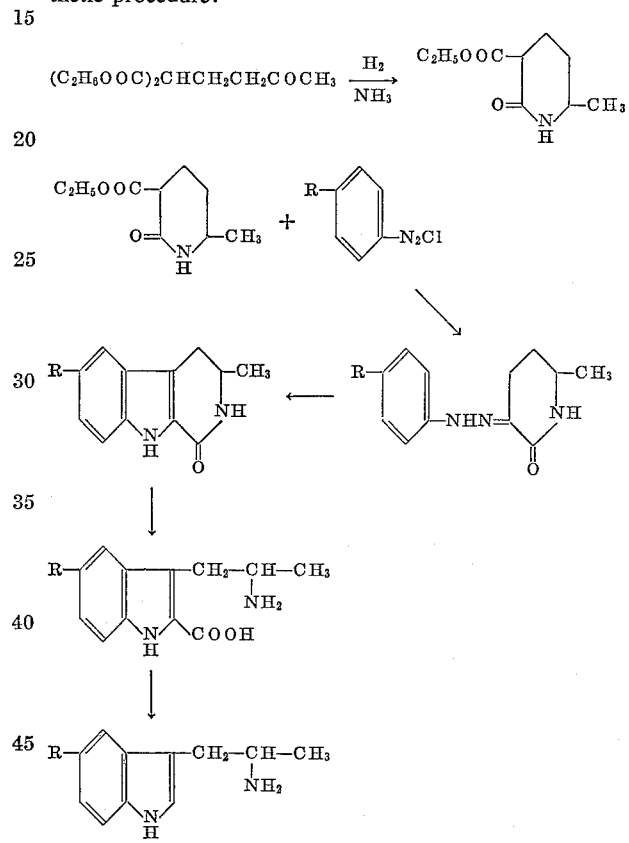

when R is as previously defined.

Diethyl α-(3-oxobutyl)malonate in an ammoniacal lower alcohol solution, such as methanol or ethanol, is hydrogenated in the presence of a hydrogenation catalyst such as, for example, platinum oxide or Raney nickel at about 40 to 60 lbs. of hydrogen pressure for about two to six hours at elevated temperatures. Removal of the catalyst by filtration, evaporation of the solvent and distillation of the residue gives 6-methyl-2-oxonipecotate.

A solution of the nipecotate in a water immiscible solvent such as ether or benzene is stirred with an excess of an aqueous solution of alkali metal hydroxide, such as potassium or sodium hydroxide for 10 to 20 hours, neutralized with a concentrated acid such as glacial acetic acid and buffered with a suitable salt such as sodium acetate. To the above solution which is cooled in an ice bath is added a diazonium solution prepared by reacting a p-substituted aniline with concentrated hydrochloric acid and sodium nitrite in cold aqueous solution. The nipecotate and the p-substituted aniline are present in approximately equimolar amounts. The resulting mixture is stirred for about two to five hours and filtered to give 6-methyl-2,3-piperidinedione 3-(p-substituted-phenyl)hydrazone.

The hydrazone is cyclized, advantageously, by heating, conveniently at reflux temperature, with a large excess of formic acid for about one to four hours. Diluting the mixture with water and filtering gives 6-substituted-3,4-dihydro-3-methyl-9H-pyrid[3,4-b]indole-1(2)-one.

This pyrid [3,4-b]indole is heated, conveniently at reflux temperature with an aqueous alcohol solution, preferably methanol or ethanol, containing an excess of an alkali metal hydroxide such as sodium or potassium hydroxide. The solution is neutralized with a mineral acid such as, preferably, sulfuric acid, concentrated, cooled and filtered to give 3-(2'-aminopropyl)-5-substituted-2-indolecarboxylic acid.

The indolecarboxylic acid is decarboxylated by heating, conveniently at reflux temperature, with an aqueous acid solution, such as hydrochloric acid or a combination of acids such as hydrochloric and glacial acetic acids. Cooling the resulting solution, washing with a water-immiscible organic solvent such as ether or benzene, neutralizing with an alkali metal hydroxide solution, such as sodium or potassium hydroxide, extracting with an organic solvent such as ether and evaporating the extracts gives, as the residue, the 3-(2'-aminopropyl)-5-substituted-indoles of Formula I.

Monomethylation of the amino group of the 3-(2'-aminopropyl-5-substituted-indole is accomplished by treating at least an equimolar amount of the indole with ethyl chloroformate in a dry organic solvent such as benzene or toluene and reducing the resulting carbamates with lithium aluminum hydride. Dimethylation is accomplished by the same procedure when the starting material is a methyl derivative.

It will be readily apparent to one skilled in the art that the compounds of Formula I may be present as optical isomers. The connotation of the general formula presented herein is to include all isomers, the separated $d$ or $l$ optical isomers as well as the $dl$ mixture of these isomers.

The compositions according to this invention comprise, in dosage unit form, a pharmaceutical carrier and a 5-substituted-3-(2'-aminopropyl)indole of Formula I or a nontoxic, pharmaceutically acceptable, acid addition salt thereof in an amount sufficient to produce tryptamine antagonism.

The pharmaceutical carrier may be, for example, either a solid or a liquid. Exemplary of solid carriers are lactose, magnesium stearate, terra alba, sucrose, talc, stearic acid, gelatin, agar, pectin or acacia. Exemplary of liquid carriers are peanut oil, olive oil, sesame oil and water. Similarly, the carrier or diluent may include a time delay material such as glyceryl monostearate or glyceryl disterate, alone or with a wax.

A wide variety of pharmaceutical forms can be employed. Thus, if a solid carrier is used, the preparation can be tabletted, placed in a hard gelatin capsule or in the form of a troche or lozenge. The amount of solid carrier will vary widely but preferably will be from about 25 mg. to about 1 gm. If a liquid carrier is used, the preparation may be in the form of a soft gelatin capsule, placed in an ampule or in a liquid suspension.

The method of producing tryptamine antagonism in mammals in accordance with this invention comprises administering internally, in an amount sufficient to produce tryptamine antagonism, a compound selected from the 5-substituted-3-(2'-aminopropyl)indoles of Formula I or nontoxic, pharmaceutically acceptable, acid addition salts thereof.

The composition according to this invention will preferably contain a 5-substituted-3-(2'-aminopropyl)indole ingredient in an amount of from about 5 mg. to about 200 mg., advantageously from about 10 mg. to about 100 mg. per dosage unit. The administration may be parenterally or orally. Advantageously, equal doses will be administered one to four times daily. Preferably the daily dosage regimen will be from about 10 mg. to about 400 mg., and advantageously from about 50 mg. to about 300 mg. of active medicament in pharmaceutical forms. When the administration described above is carried out tryptamine antagonism is produced.

The following examples are not limiting but are illustrative of the invention.

Example 1

A solution of 23.0 g. of diethyl α-(3-oxobutyl)malonate in 150 ml. of methanol containing 7.0 g. of ammonia is hydrogenated over 0.5 g. of platinum oxide at 50 lbs. of hydrogen pressure and the filtrate concentrated and distilled to give ethyl 6-methyl-2-oxonipecotate, B.P. 136–139° C. at 0.4 mm.

A mixture of 21.0 g. of ethyl 6-methyl-2-oxonipecotate in 100 ml. of ether is stirred overnight with 200 ml. of 5% aqueous potassium hydroxide. The resulting aqueous solution is neutralized with 15 ml. of glacial acetic acid, buffered with 33 g. of sodium acetate and chilled in an ice bath. A diazonium solution is made from 13.9 g. of p-anisidine in 24 ml. of concentrated hydrochloric acid and 79 g. of ice with 8.15 g. of sodium nitrite in 20 ml. of water. This is added with stirring to the cold solution prepared above. The resulting mixture is stirred for three hours and filtered. The red solid is triturated with methanol and filtered to obtain 6-methyl-2,3-piperidinedione-3-(p-methoxyphenyl)hydrazone, M.P. 207–209° C.

A mixture of 14.2 g. of the hydrazone prepared above and 200 ml. of 70% formic acid is stirred and refluxed for 90 minutes, then poured into water and filtered to give 3,4-dihydro-6-methoxy-3-methyl-9H-pyrid[3,4-b]indole-1(2)-one, which after recrystallization from benzene-methanol melts at 267–269° C.

Five grams of 3,4-dihydro-6-methoxy-3-methyl-9H-pyrid[3,4-b]indole-1(2)-one in 120 ml. of aqueous alcohol solution containing 11.0 g. of potassium hydroxide is stirred and refluxed for 24 hours. The resulting solution is diluted with water and brought to pH 7 with sulfuric acid. The water is evaporated in vacuo, the residue washed with 200 ml. of hot methanol then boiled in 300 ml. of water, cooled and filtered to give 3-(2'-aminopropyl)-5-methoxy-2-indolecarboxylic acid which is recrystalized from water to give pure material melting at 263–264° C.

A solution of 1.0 g. of the above prepared indolecarboxylic acid in 100 ml. of 5% hydrochloric acid is refluxed for 30 minutes, cooled, washed with ether and made basic with 40% sodium hydroxide solution. The basic solution is extracted with ether. The ether solution is washed with water, dried over magnesium sulfate and evaporated in vacuo to give, as the residue, crude 3-(2'-aminopropyl)-5-methoxyindole. This indole is dissolved in 20 ml. of methanol and acidified with ethereal hydrogen chloride. Dilution with ether, cooling and filtration gives 3-(2'-aminopropyl)-5-methoxyindole hydrochloride, M.P. 222–223° C.

A solution of 1.0 g. of the free base, 3-(2'-aminopropyl)-5-methoxyindole, in 100 ml. of ether is treated with an excess of alcoholic sulfuric acid to give the sulfate salt.

Example 2

To a mixture of 22.0 g. of 3-(2'-aminopropyl)-5-methoxyindole (made as in Example 1), 25 ml. of pyridine and 200 ml. of dry benzene is added slowly with cooling a solution of 11.0 g. of ethyl chloroformate in 50 ml. of dry benzene. The resulting mixture is stirred at room temperature for four hours, allowed to stand overnight and diluted with water. The organic layer is separated, washed with water, with dilute hydrochloric acid and again with water. Drying over magnesium sulfate and evaporating the solvent in vacuo leaves, as the residue, the crude carbamate. The residue is dissolved in ether and added slowly to 7.5 g. of lithium aluminum hydride in 125 ml. of dry ether. The resulting mixture is refluxed for seven hours, then decomposed with 7.5 g. of water, 7.5 ml. of 10% sodium hydroxide solution, followed by 20 ml. of water. The mixture is refluxed for one hour and filtered. The ether filtrate is extracted with dilute hydrochloric acid. The acid solution is washed with ether, made basic with 40% sodium hydroxide and extracted with ether. The ethereal solution is dried and evaporated in vacuo to give 5 - methoxy-3-(2'-methylaminopropyl)indole as the residue.

*Example 3*

A mixture of 11.7 g. of 5-methoxy-3-(2'-N-methylaminopropyl)indole, made as in Example 2, 15 ml. of pyridine and 125 ml. of benzene is treated with a solution of 5.5 g. of ethyl chloroformate in 30 ml. of dry benzene. The resulting mixture is stirred for four hours at room temperature, allowed to stand overnight and worked up as in Example 2 to give the corresponding carbamate.

This carbamate is reduced in ether solution with 3.8 g. of lithium aluminum hydride as in Example 2 to give 3-(2'-N,N-dimethylaminopropyl)-5-methoxyindole.

A solution of the free base in methanol is treated with an excess of ethereal hydrogen bromide. Dilution with ether, cooling and filtration yields the hydrobromide salt.

*Example 4*

A solution of 18.6 g. of ethyl 6-methyl-2-oxonipecotate, prepared as in Example 1, in 100 ml. of ether is stirred overnight with 200 ml. of 5% potassium hydroxide solution. The resulting aqueous solution is neutralized with 14 ml. of glacial acetic acid, buffered with 30 g. of sodium acetate and cooled in an ice bath. A diazonium solution (prepared by mixing 12.8 g. of p-chloroaniline in 22 ml. of concentrated hydrochloric acid and 22 ml. of water with 7.45 g. of sodium nitrite in 20 ml. of water) is added portionwise with stirring to the cold solution prepared above. The resulting mixture is stirred for three hours and filtered. The solid material obtained is washed with ethanol to give 6-methyl-2,3-piperidinedione 3-(p-chlorophenyl)hydrazone, M.P. 228–229° C.

A mixture of 20.4 g. of the hydrazone prepared above and 300 ml. of 70% formic acid is stirred and refluxed for three hours, then poured into water. Filtration and recrystallization from benzene-ethanol gives 6-chloro-3,4-dihydro - 3-methyl-9H-pyrid[3,4-b]indole-1(2)-one, M.P. 233–235° C.

A mixture of 5.0 g. of the above prepared pyrid[3,4-b]-indole and 11.0 g. of potassium hydroxide in 90 ml. of water and 75 ml. of aqueous ethanol is refluxed for six hours. The solution is brought to pH 6 with sulfuric acid, the alcohol removed in vacuo and the residue cooled and filtered to give 3-(2'-aminopropyl)-5-chloro-2-indolecarboxylic acid, M.P. 253–257° C.

This indolecarboxylic acid (4.15 g.) in 80 ml. of 20% hydrochloric acid and 25 ml. of glacial acetic acid is refluxed for 24 hours, cooled and washed with ether. The solution is made basic with 40% sodium hydroxide and extracted with ether. The extracts are washed with ether, dried over magnesium sulfate and evaporated in vacuo to give crude 3-(2'-aminopropyl)-5-chloroindole.

The free base (1.0 g.) is dissolved in 20 ml. of ethanol, acidified with ethereal hydrogen chloride, diluted with ether, cooled and filtered. The crystalline solid is recrystallized from ethanol-ether to give 3-(2'-aminopropyl)-5-chloroindole hydrochloride, M.P. 240–241° C.

*Example 5*

A mixture of 18.5 g. of ethyl 6-methyl-2-oxonipecotate (prepared as in Example 1) in 100 ml. of ether and 200 ml. of 5% potassium hydroxide solution is stirred overnight. The resulting aqueous solution is neutralized with glacial acetic acid, buffered with sodium acetate and cooled in an ice bath. A diazonium solution is made by treating 16.1 g. of p-trifluoromethylaniline in 25 ml. of concentrated hydrochloric acid and 80 g. of ice with 8.2 g. of sodium nitrite in 20 ml. of water. This is added to the cold potassium hydroxide solution. The resulting mixture is stirred for three hours and filtered. The solid material is washed with ethanol to give 6-methyl-2,3-piperidinedione 3-(p-trifluoromethylphenyl)hydrazone.

A mixture of 15.0 g. of this hydrazone is refluxed with 200 ml. of 70% formic acid for two hours, then poured into water and filtered to give 3,4-dihydro-3-methyl-6-trifluoromethyl-9H-pyrid[3,4-b]indole-1(2)-one which is purified by recrystallization from benzene-ethanol.

A mixture of 7.0 g. of the above prepared pyrid[3,4-b]-indole in 150 ml. of 40% aqueous methanol solution containing 15.0 g. of potassium hydroxide is refluxed for 16 hours. Working up as in Example 4 gives 3-(2'-aminopropyl)-5-trifluoromethyl - 2-indolecarboxylic acid. A solution of 1.0 g. of this indolecarboxylic acid is refluxed with 100 ml. of 5% hydrochloric acid for one hour. The solution is worked up as in Example 4 to give 3-(2'-aminopropyl)-5-trifluoromethylindole.

A solution of this indole (2.0 g.) in 20 ml. of ethanol is treated with an excess of ethereal hydrogen chloride, diluted with ether, cooled and filtered. The crystalline material thus obtained is recrystallized from ethanol-ether to give 3-(2'-aminopropyl)-5-trifluoromethylindole hydrochloride.

*Example 6*

Ingredients: Amounts, mg.
3-(2'-aminopropyl)-5-methoxyindole hydrochloride _____ 50
Sucrose _____ 50
Starch _____ 25
Talc _____ 5
Stearic acid _____ 2

The active ingredient and the sucrose are mixed and granulated with 10% gelatin solution. The wetted mass is passed through a #6 U.S. mesh screen directly onto drying trays. The granules are dried and passed through a #20 U.S. mesh screen. These granules are then mixed with the starch, talc and stearic acid, passed through a #60 U.S. mesh screen and then compressed into tablets. One tablet is administered three times a day.

*Example 7*

Ingredients: Amounts, mg.
3-(2'-aminopropyl)-5-chloroindole hydrochloride _____ 75
Lactose _____ 100

Screen the ingredients through a #40 U.S. mesh screen, transfer to mixer, mix well and fill into a hard gelatin capsule.

*Example 8*

Ingredients: Amounts, mg.
3-(2'aminopropyl)-5-chloroindole _____ 50
Peanut oil _____ 75

The ingredients are mixed into a thick slurry and filled into a soft gelatin capsule.

What is claimed is:

1. A method of producing tryptamine antagonism in mammals which comprises administering internally, in an amount sufficient to produce tryptamine antagonism, a compound selected from the group consisting of a 5-substituted-3-(2'-aminopropyl)indole of the formula:

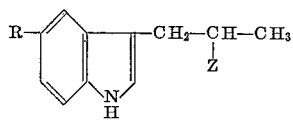

when:

R is a member selected from the group consisting of methoxy, chloro and trifluoromethyl, and Z is a member selected from the group consisting of amino, monomethylamino and dimethylamino;

and a nontoxic, pharmaceutical acceptable, acid addition salt thereof.

2. A method of producing tryptamine antagonism in mammals which comprises administering internally 3-(2'-aminopropyl)-5-chloroindole in an amount sufficient to produce tryptamine antagonism.

3. A method of producing tryptamine antagonism in mammals which comprises administering internally 3-(2'-aminopropyl)-5-chloroindole hydrochloride in an amount sufficient to produce tryptamine antagonism.

4. A method of producing tryptamine antagonism in mammals which comprises administering internally 3-(2'-aminopropyl)-5-methoxyindole in an amount sufficient to produce tryptamine antagonism.

5. A method of producing tryptamine antagonism in mammals which comprises administering internally 3-(2'-aminopropyl)-5-methoxyindole hydrochloride in an amount sufficient to produce tryptamine antagonism.

References Cited by the Examiner
UNITED STATES PATENTS

| | | | |
|---|---|---|---|
| 2,995,566 | 8/61 | Sletzinger | 167—65 |
| 3,042,684 | 7/62 | Young | 167—65 |

LEWIS GOTTS, *Primary Examiner.*

MORRIS O. WOLK, *Examiner.*